United States Patent
Dubin et al.

(10) Patent No.: US 11,971,138 B2
(45) Date of Patent: Apr. 30, 2024

(54) PRESSURE VESSEL WITH CIRCUMFERENTIAL REINFORCING ELEMENTS

(71) Applicant: IFP Energies nouvelles, Rueil-Malmaison (FR)

(72) Inventors: Victor Dubin, Rueil-Malmaison (FR); David Teixeira, Rueil-Malmaison (FR); Navid Saeedi, Rueil-Malmaison (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 317 days.

(21) Appl. No.: 17/439,052

(22) PCT Filed: Mar. 18, 2020

(86) PCT No.: PCT/EP2020/057390
§ 371 (c)(1),
(2) Date: Sep. 14, 2021

(87) PCT Pub. No.: WO2020/193298
PCT Pub. Date: Oct. 1, 2020

(65) Prior Publication Data
US 2022/0170592 A1 Jun. 2, 2022

(30) Foreign Application Priority Data
Mar. 22, 2019 (FR) ...................................... 1902979

(51) Int. Cl.
*F17C 1/00* (2006.01)
(52) U.S. Cl.
CPC ........ *F17C 1/00* (2013.01); *F17C 2201/0109* (2013.01); *F17C 2201/0119* (2013.01);
(Continued)

(58) Field of Classification Search
CPC ................ F17C 1/00; F17C 2201/0109; F17C 2201/0119; F17C 2201/052;
(Continued)

(56) References Cited

U.S. PATENT DOCUMENTS 1,564,854 A * 12/1925 Jagschitz ................ F17B 1/013
 48/176
3,184,092 A * 5/1965 George ..................... F17C 1/06
 156/169

(Continued)

FOREIGN PATENT DOCUMENTS

| FR | 2606061 A1 | 5/1988 |
| FR | 3055942 A1 | 3/2018 |
| GB | 131155 A | 8/1919 |

OTHER PUBLICATIONS

Preliminary Search Report for PCT/EP2020/057390 dated Jul. 3, 2020.

*Primary Examiner* — Kareen K Thomas
(74) *Attorney, Agent, or Firm* — Fitch, Even, Tabin & Flannery LLP

(57) ABSTRACT

The present invention is a pressure tank comprising a tubular part and two bottoms (5) with the bottoms (5) positioned at the ends of the tubular part. The tubular part comprises a cylindrical wall (1) and a ply of circumferential reinforcing elements (2) wound around cylindrical wall (1). The elastic modulus of the material of cylindrical wall (1) is less than the elastic modulus of the material of the first ply of circumferential reinforcing elements (2). The invention also relates to an energy storage and recovery system comprising a compressor, an expansion device, a heat storage and a compressed air tank according to the aforementioned characteristics.

20 Claims, 6 Drawing Sheets

(52) U.S. Cl.
CPC .. *F17C 2201/052* (2013.01); *F17C 2201/054* (2013.01); *F17C 2203/013* (2013.01); *F17C 2203/0604* (2013.01); *F17C 2203/0609* (2013.01); *F17C 2203/0619* (2013.01); *F17C 2203/0621* (2013.01); *F17C 2203/0636* (2013.01); *F17C 2203/066* (2013.01); *F17C 2203/0673* (2013.01); *F17C 2205/0126* (2013.01); *F17C 2209/234* (2013.01); *F17C 2221/031* (2013.01); *F17C 2223/0123* (2013.01); *F17C 2223/036* (2013.01); *F17C 2227/0157* (2013.01); *F17C 2260/012* (2013.01); *F17C 2260/017* (2013.01); *F17C 2265/07* (2013.01); *F17C 2270/0147* (2013.01); *F17C 2270/0581* (2013.01)

(58) Field of Classification Search
CPC .......... F17C 2201/054; F17C 2203/013; F17C 2203/0604; F17C 2203/0609; F17C 2203/0619; F17C 2203/0621; F17C 2203/0636; F17C 2203/066; F17C 2203/0673; F17C 2205/0126; F17C 2209/234; F17C 2221/031; F17C 2223/0123; F17C 2223/036; F17C 2227/0157; F17C 2260/012; F17C 2260/017; F17C 2265/07; F17C 2270/0147; F17C 2270/0581; Y02E 60/16
See application file for complete search history.

(56) References Cited

U.S. PATENT DOCUMENTS

| | | | | |
|---|---|---|---|---|
| 4,561,292 A | * | 12/1985 | Pugnale | G01M 3/32 220/567.1 |
| 5,651,474 A | * | 7/1997 | Callaghan | B29C 70/088 220/565 |
| 7,131,553 B2 | * | 11/2006 | Sanders | B29C 65/78 220/581 |
| 7,641,949 B2 | * | 1/2010 | DeLay | B29C 53/602 220/586 |
| 8,308,017 B2 | * | 11/2012 | Schlag | F16J 12/00 220/586 |
| 9,205,373 B2 | * | 12/2015 | Leavitt | B01D 53/22 |
| 11,629,819 B2 | * | 4/2023 | Lee | F17C 1/16 220/589 |
| 2003/0111473 A1 | * | 6/2003 | Carter | F17C 13/025 220/586 |
| 2006/0231560 A1 | * | 10/2006 | Blanke-Bohne | B01J 4/001 220/560.02 |
| 2007/0068953 A1 | * | 3/2007 | Immel | F17C 13/021 220/560.1 |
| 2007/0199941 A1 | * | 8/2007 | Reese | F17C 3/02 62/48.1 |
| 2008/0000915 A1 | * | 1/2008 | Silva | F17C 13/021 220/560.09 |
| 2009/0308874 A1 | * | 12/2009 | Lindner | F17C 1/16 220/591 |
| 2009/0314785 A1 | * | 12/2009 | Cronin | B29C 53/602 156/305 |
| 2015/0144643 A1 | * | 5/2015 | Cruz | F17C 9/02 220/586 |
| 2016/0138757 A1 | * | 5/2016 | Clark | F28D 15/00 165/104.28 |
| 2017/0247877 A1 | * | 8/2017 | Yamada | E04H 7/06 |
| 2017/0306566 A1 | * | 10/2017 | Bailey | D21H 27/005 |
| 2017/0343158 A1 | * | 11/2017 | Kato | F17C 1/06 |
| 2018/0259129 A1 | * | 9/2018 | Christ | F17C 1/06 |
| 2021/0254787 A1 | * | 8/2021 | Takami | F17C 1/16 |

* cited by examiner

[Fig 1]
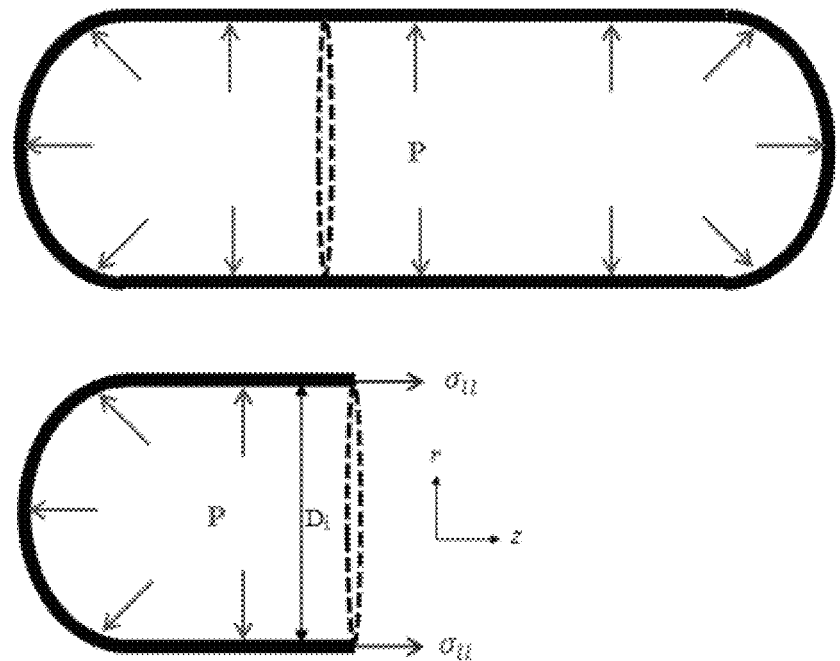
[Fig 2]
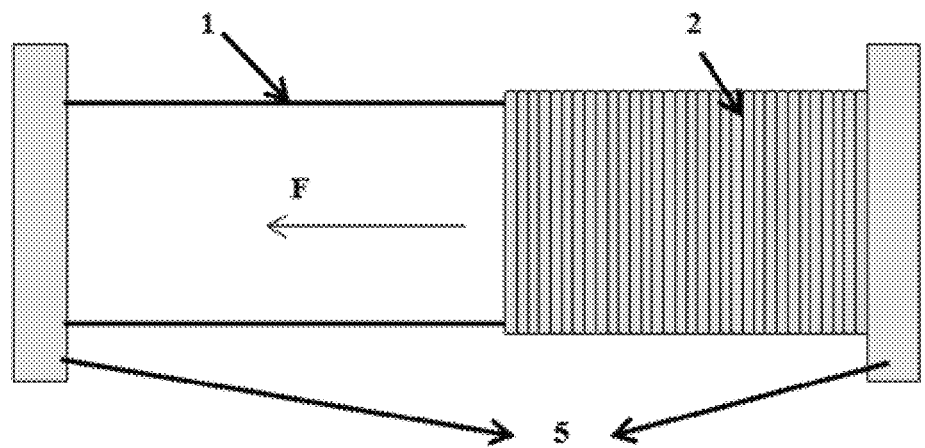

[Fig 3a]
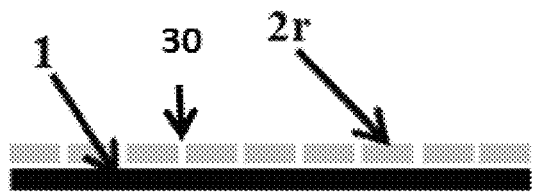
[Fig 3b]
[Fig 4]
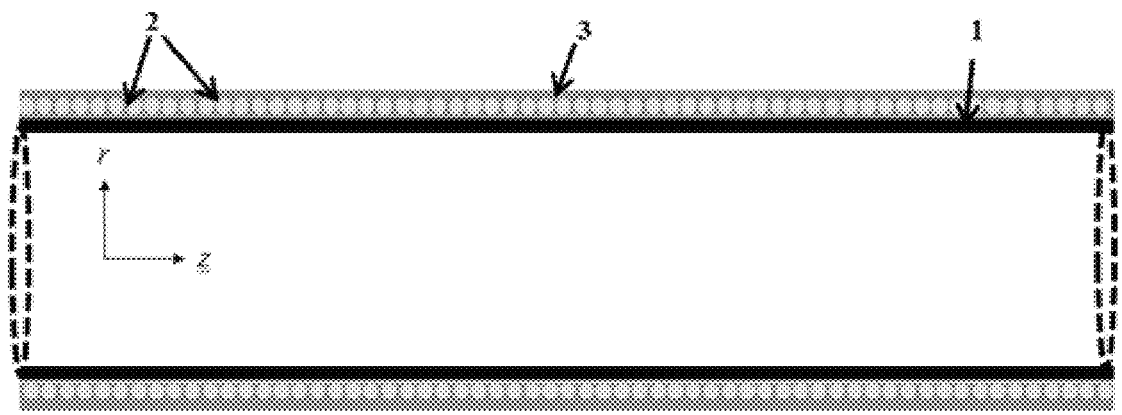
[Fig 5]
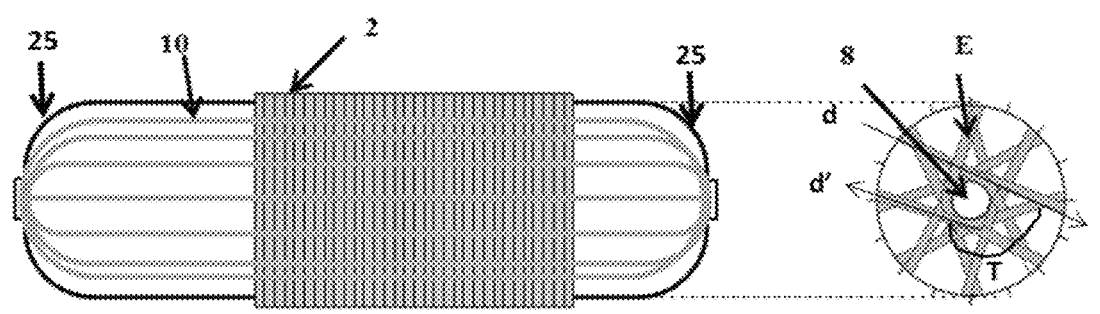

[Fig 6]
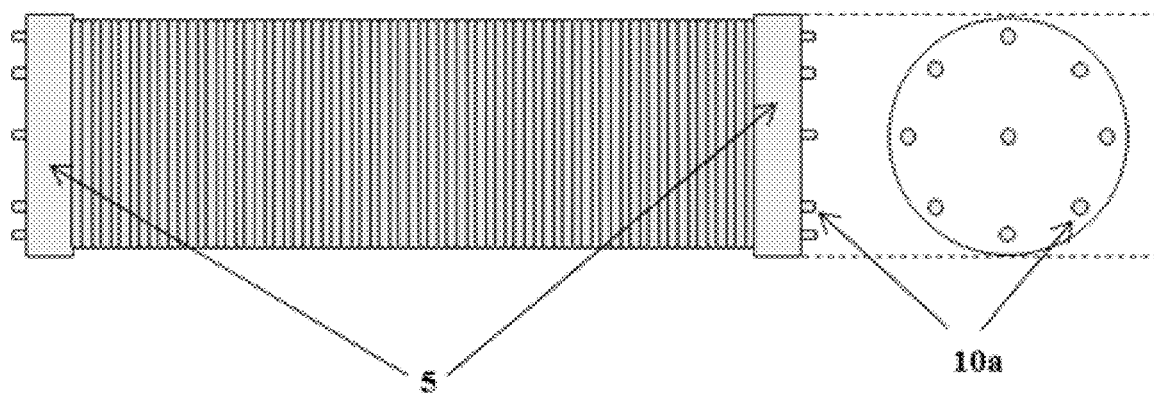
[Fig 7]
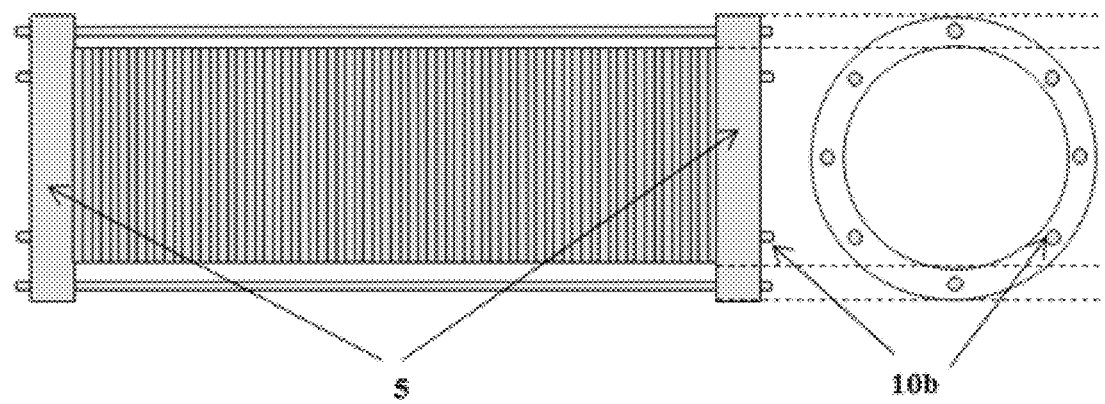
[Fig 8]
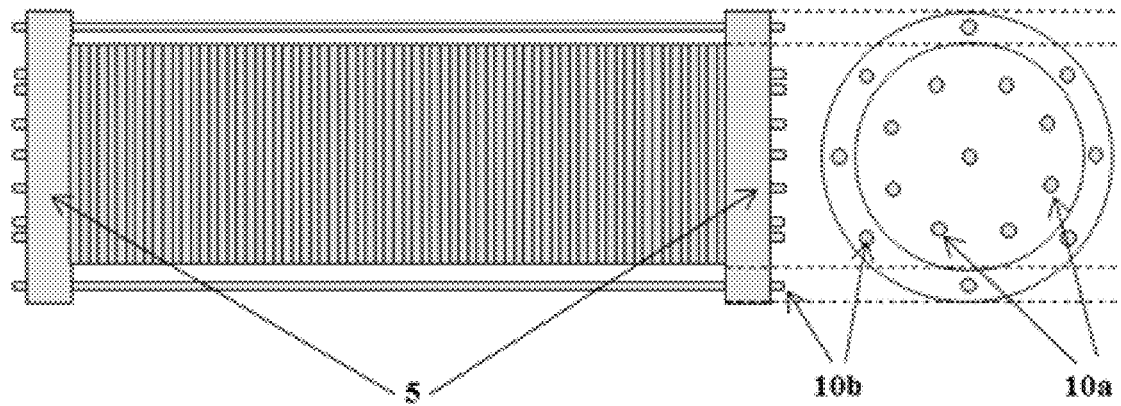

[Fig 9]
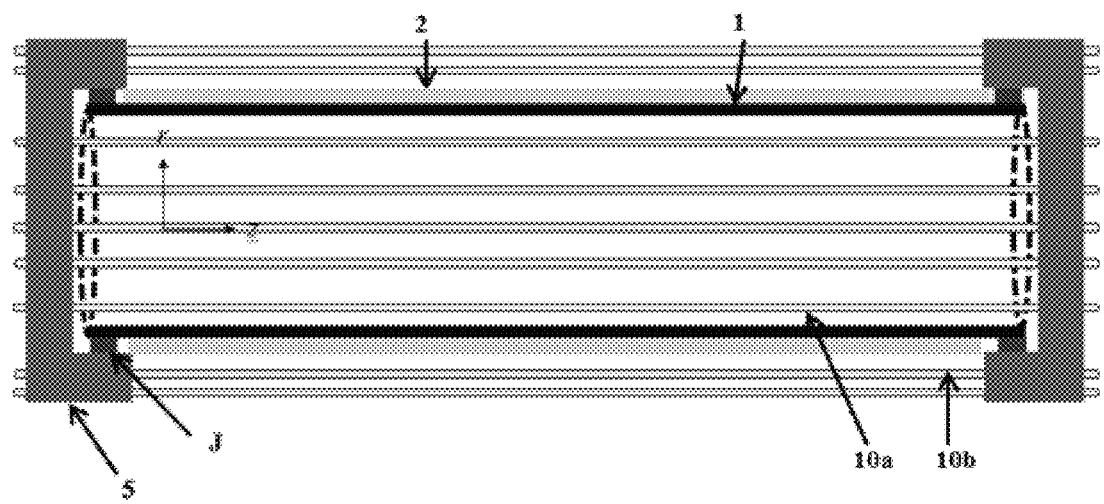
[Fig 10]
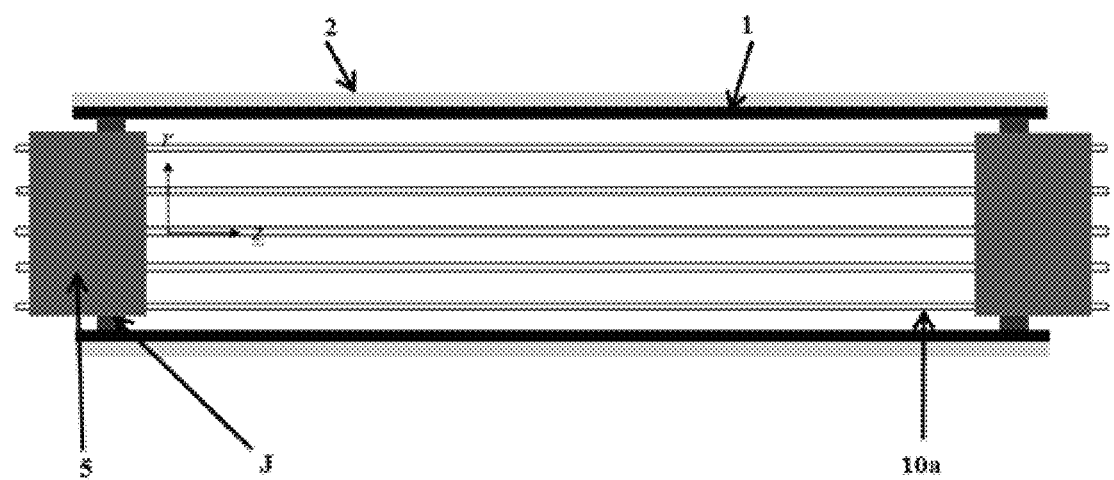

[Fig 11]
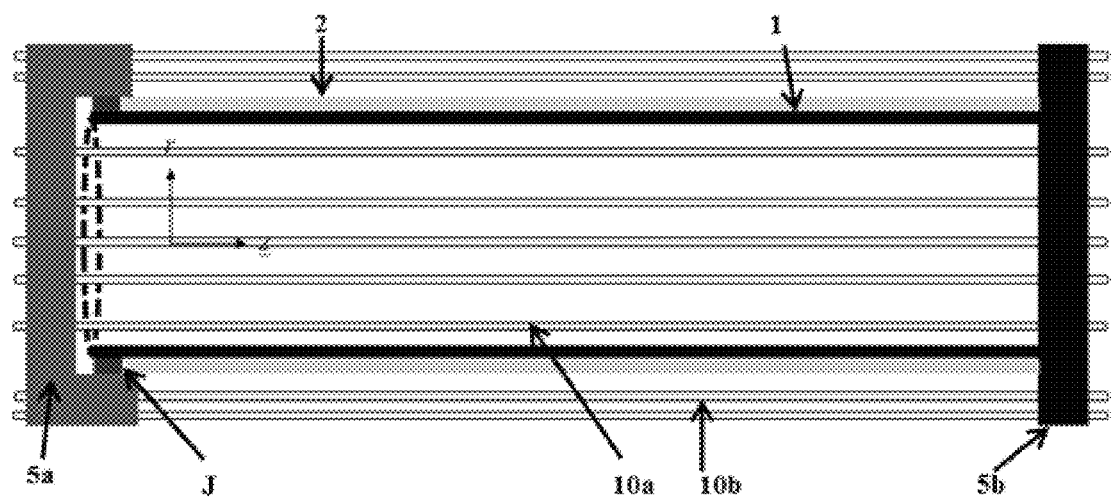
[Fig 12]
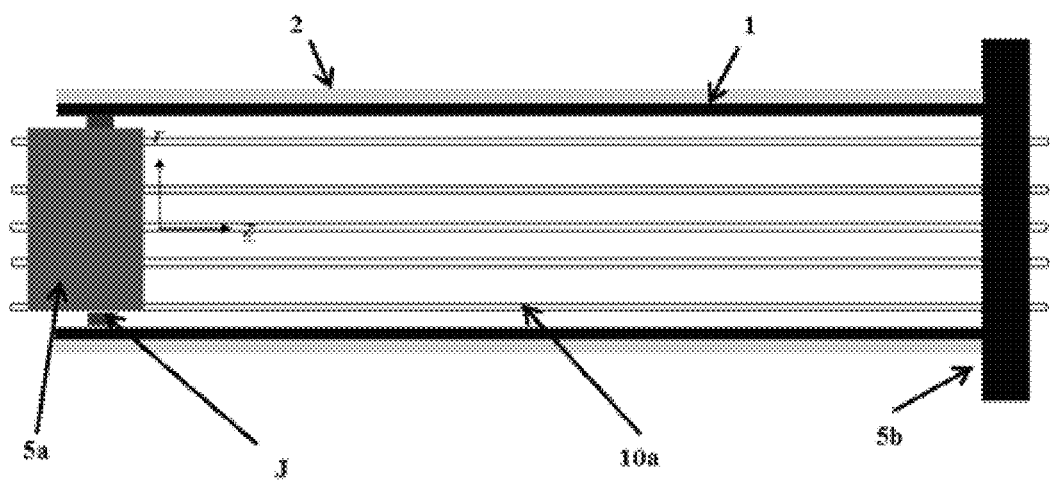

[Fig 13]
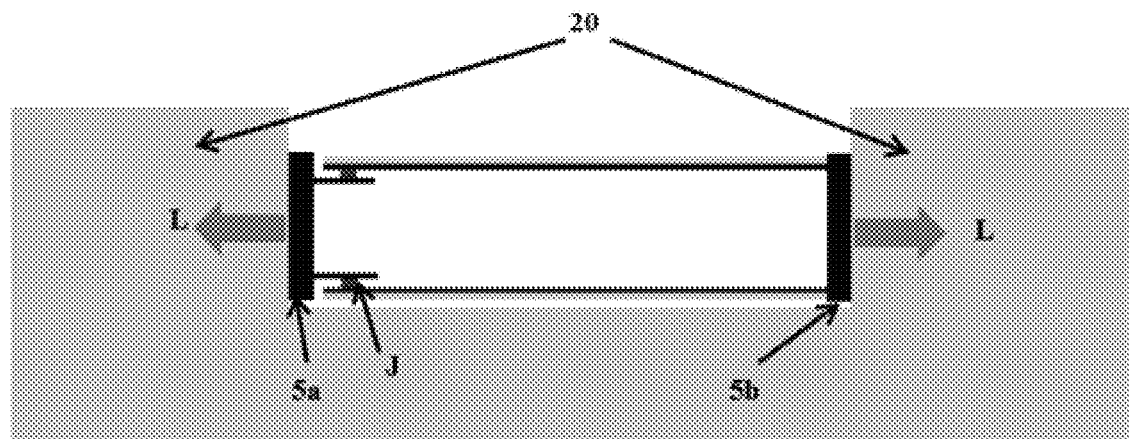

PRESSURE VESSEL WITH CIRCUMFERENTIAL REINFORCING ELEMENTS

CROSS-REFERENCE TO RELATED APPLICATIONS

This application claims priority from International Patent Application No. PCT/EP2020/057390, filed Mar. 18, 2020, and French Application No. 19/02.979 filed Mar. 22, 2019 which are hereby incorporated herein by reference in their entirety.

BACKGROUND OF THE INVENTION

Field of the Invention

The present invention mainly relates to the field of compressed air energy storage and other pressure tank systems.

Description of the Prior Art

Electricity production from renewable energies, for example by solar panels, or onshore or offshore wind turbines, is booming. The main drawbacks of these power production systems are intermittent production and the possible mismatch between the production period and the consumption period. There is therefore a need for energy storage during production which permits later release during a consumption period.

There are many technologies allowing this balance to be achieved.

Among them, the best known is the Pumped Storage Plant (PSP), which uses two water reservoirs at different elevations. The water is pumped from the lower basin to the upper basin during the charging phase. The water is subsequently sent to a turbine in the direction of the lower basin during discharge.

Batteries of different types (lithium, nickel, sodium-sulfur, lead-acid, etc.) can also meet this need for energy storage.

Another technology, Flywheel Energy Storage (FES), accelerates a rotor (flywheel) to a very high speed which maintains the energy in the system in form of kinetic energy. When energy is extracted from the FES system, the rotational speed of the flywheel is reduced as a consequence of the energy conservation principle. Adding energy to the FES system therefore causes a flywheel speed increase.

The energy storage technology using compressed gas (often compressed air) is promising. The produced energy that is not consumed is used for compressing air to pressures ranging between 40 bars and 200 bars using (possibly multi-stage) compressors. During compression, the air temperature increases. In order to limit the cost of storage tanks and to minimize the electricity consumption of the compressor, the air can be cooled between each compression stage. The compressed air is then stored under pressure, either in natural cavities (caves) or in artificial reservoirs.

During the electricity production phase, the stored air is then sent to turbines for producing electricity. Upon expansion, the air cools down. In order to avoid too low temperatures (−50° C.) causing damage to the turbines, the air can be heated prior to expansion. Such plants have been operating for a number of years now, such as, for example, the Huntorf plant in Germany, operating since 1978, or the Macintosh plant in the USA (Alabama), since 1991. These two plants have the particular feature of using the stored compressed air for feeding gas turbines. These gas turbines burn natural gas in the presence of air under pressure in order to generate very hot combustion gases (550° C. and 825° C.) at high pressure (40 bars and 11 bars) prior to expanding them in turbines generating electricity. This type of process emits carbon dioxide.

There is a variant under development which is a adiabatic process wherein the heat resulting from the compression of air is recovered, stored and released to the air prior to expanding it. This technology is known as AACAES (Advanced Adiabatic Compressed Air Energy Storage).

In an AACAES system, the compressed air is stored in a tank independently of the heat storage. In such a system, the air is stored at a temperature close to ambient temperature (a priori below 50° C.).

BACKGROUND OF THE INVENTION

To date, compressed air tanks and, more broadly, pressure tanks are closed capacities being at least two ends, also referred to as "bottoms", and possibly connected by an intermediate part as shown in FIG. 1, where P is the internal pressure. In this figure, the tank is represented, by way of non-limitative example, by a cylindrical part of inside diameter $D_i$ (direction r being the radial direction and direction z the axial direction of a cylindrical coordinate system associated with the tank. This coordinate system is used in the other figures and is therefore not re-detailed in each figure). Thus, this type of tank can be, for example, a sphere made up of two half-spheres, or a cylindrical capacity consisting of two bottoms connected to one another by a cylindrical section. The connections between the various parts are rigid, of embedded type.

Furthermore, these tanks are in most cases made of steel to withstand high pressures. Considering the large storage volumes and high pressures, the manufacturing cost of these large-volume pressure tanks is very high, notably because of the mass of steel required.

In a closed cylindrical tank, the bottom effects resulting from the internal pressure applied onto the tank bottoms generate tensile forces in the longitudinal direction and therefore axial stresses σll, as illustrated in FIG. 1. Whatever the shape of the bottom (flat, dished, hemispherical, etc.), the bottom effects of this type of tank generate the following average longitudinal stress in the running part of the tank:

$$\sigma_{ll} = \frac{PD_i^2}{4t(D_i + t)}$$

where P: pressure applied in the tank
$D_i$: inside diameter of the tank
T: thickness of the tank wall at the cylindrical part.
When the pressure tank has a thin wall, the relationship is:

$$\sigma_{ll} \cong \frac{PD_i}{4t}$$

A thin-walled pressure tank is understood to be a pressure tank whose tank thickness is very small compared to its diameter (a small thickness compared to its diameter is understood to be a ratio such as $t/D_i < 5\%$).

Since the principle of prestressed concrete pipes is known, such pipes are mainly intended for fluid transfer (sanitation, water transfer, etc.) with low working pressures (less than 20 bars and most often less than 5 bars).

Patent application FR-3,055,942 A1 relates to the running section of mixed steel-prestressed concrete pipes.

However, these various solutions all generate tanks of great mass and high manufacturing costs.

SUMMARY OF THE INVENTION

To overcome the aforementioned drawbacks, the present invention relates to a pressure tank comprising a tubular part and two bottoms, the two bottoms being positioned at the ends of the tubular part with the tubular part comprising a cylindrical wall and at least a first ply of circumferential reinforcing elements. The first ply of circumferential reinforcing elements is wound around the cylindrical wall serving as a rigid base for winding, in such a way that the elastic modulus of the material of the cylindrical wall is less than the elastic modulus of the material of the first ply of circumferential reinforcing elements.

SUMMARY OF THE INVENTION

The invention relates to a pressure tank comprising a tubular part and two bottoms with bottoms being positioned at the ends of the tubular part, the tubular part comprising a cylindrical wall and at least a first ply of circumferential reinforcing elements, the first ply of circumferential reinforcing elements being wound around the cylindrical wall. The elastic modulus of the material of the cylindrical wall is less than the elastic modulus of the material of the first ply of circumferential reinforcing elements.

Preferably, the elastic modulus of the material of the cylindrical wall is at least 10%, preferably at least 30% less than the elastic modulus of the material of the first ply of circumferential reinforcing elements.

According to one embodiment of the invention, at least one of the two bottoms is a dished bottom which is preferably spherical or hemispherical.

Advantageously, the tank comprises at least a second ply of axial reinforcing elements, which extends in at least one of the axial direction and axial reinforcing elements including burial in the ground of the pressure tank.

According to one variant of the invention, the axial reinforcing elements of the second ply extend in the region of the dished bottom in the direction of the axial end of the dished bottom, by forming a star on the dished bottom.

Advantageously, at least a second ply of axial reinforcing elements is positioned within the inner cylinder defined by the cylindrical wall with the axial reinforcing elements of the second ply being evenly distributed over the circumference of the cylindrical wall.

Preferably, at least a second ply of axial reinforcing elements is positioned outside the tubular part, the axial reinforcing elements of the second ply being evenly distributed over the circumference of the tubular part.

Advantageously, the material of the circumferential reinforcing elements of the first ply is a polymer, preferably an aramid fiber, a polyamide nylon, a polypropylene or a polyethylene, and more preferably a high resistance polyethylene.

Preferably, the material of the cylindrical wall is a metallic material, preferably steel, or a polymer.

According to an embodiment of the invention, the circumferential reinforcing elements of the first ply are coated with a protective layer.

Advantageously, the circumferential reinforcing elements of at least one of the first ply and the axial reinforcing elements of the second ply have a circular, substantially circular or rectangular section.

According to one variant, the tank comprises at least one sliding connection between cylindrical wall and at least one of the two bottoms.

Preferably, the sliding connection is positioned between the outside diameter of the cylindrical wall and the inside diameter of the bottom.

Preferably, the sliding connection is positioned between the outside diameter of the bottom and the inside diameter of the cylindrical wall.

According to one embodiment of the invention, at least one of the two bottoms is embedded in the ground.

The invention also relates to an energy storage and recovery system comprising at least one compressor, at least one expansion device, at least one heat storage and at least one compressed air tank as defined above.

BRIEF DESCRIPTION OF THE DRAWINGS

Other features and advantages of the system according to the invention will be clear from reading the description hereafter of embodiments given by way of non-limitative example, with reference to the accompanying figures wherein:

FIG. 1, already described, shows a cylindrical pressure tank according to the prior art;

FIG. 2 schematically illustrates, by way of non-limitative example, one embodiment of a pressure tank according to the invention;

FIG. 3a schematically illustrates, by way of non-limitative example, an embodiment of a pressure tank according to the invention comprising a ply of circumferential reinforcing elements of rectangular section;

FIG. 3b illustrates another embodiment of a pressure tank according to the invention comprising a ply of circumferential reinforcing elements of circular section;

FIG. 4 schematically illustrates, by way of non-limitative example, an embodiment of a pressure tank according to the invention comprising a ply of circumferential reinforcing elements coated with a resin;

FIG. 5 schematically illustrates, by way of non-limitative example, an embodiment of a pressure tank according to the invention comprising a ply of circumferential reinforcing elements and a ply of axial reinforcing elements, as well as dished bottoms;

FIG. 6 schematically illustrates, by way of non-limitative example, an embodiment of a pressure tank according to the invention comprising a ply of circumferential reinforcing elements and a ply of axial reinforcing elements, as well as flat bottoms;

FIG. 7 schematically illustrates, by way of non-limitative example, an embodiment of a pressure tank according to the invention comprising a ply of circumferential reinforcing elements and a ply of axial reinforcing elements, as well as flat bottoms;

FIG. 8 schematically illustrates, by way of non-limitative example, another embodiment of a pressure tank according to the invention comprising a ply of circumferential reinforcing elements and two plies of axial reinforcing elements, as well as flat bottoms;

FIG. 9 schematically illustrates, by way of non-limitative example, an embodiment of a pressure tank according to the invention comprising a ply of circumferential reinforcing elements and two plies of axial reinforcing elements, as well as sliding connections with the bottoms;

FIG. 10 schematically illustrates, by way of non-limitative example, an embodiment of a pressure tank according to the invention comprising a ply of circumferential reinforcing elements and a ply of axial reinforcing elements, as well as sliding connections with the bottoms;

FIG. 11 schematically illustrates, by way of non-limitative example, an embodiment of a pressure tank according to the invention comprising a ply of circumferential reinforcing elements and two plies of axial reinforcing elements, a sliding connection with one of the two bottoms and a stationary connection with the other bottom;

FIG. 12 schematically illustrates, by way of non-limitative example, an embodiment of a pressure tank according to the invention comprising a ply of circumferential reinforcing elements and a ply of axial reinforcing elements, a sliding connection with one of the two bottoms and a stationary connection with the other bottom; and FIG. 13 schematically illustrates, by way of non-limitative example, an embodiment of a pressure tank according to the invention comprising a ply of circumferential reinforcing elements, a sliding connection with one of the two bottoms and a stationary connection with the other bottom, the bottoms being buried in the ground.

DETAILED DESCRIPTION OF THE INVENTION

The invention relates to a pressure tank. This tank has a tubular part and two bottoms, each of the two bottoms being positioned at each end of the tubular part. The bottoms allow to sealingly close the pressure tank and to delimit a fluid storage volume. The tubular part comprises a cylindrical wall and at least a first ply of circumferential reinforcing elements wound around the cylindrical wall, serving as a rigid base for winding. The elastic modulus of the material of the cylindrical wall is less than the elastic modulus of the material of the first ply of circumferential reinforcing elements. Therefore, the deformation of the cylindrical wall tends to bring the cylindrical wall into contact with the circumferential reinforcing elements, which thus contribute to taking up the pressure forces. Thus, the thickness of the cylindrical wall can be reduced because the circumferential stresses related to the internal pressure are taken up by both the cylindrical wall and the circumferential reinforcing elements. The cylindrical wall thickness reduction allows the cost of the tank to be reduced. Furthermore, the cylindrical wall provides sealing against the internal fluid, thus preventing contact between the internal fluid and the circumferential reinforcing elements.

Advantageously, the elastic modulus of the cylindrical wall material can be at least 10%, preferably at least 30% less than the elastic modulus of the material of the first ply of circumferential reinforcing elements. Thus, taking up of the pressure forces by the circumferential reinforcing elements is facilitated, which enables the thickness of the cylindrical wall to be further reduced.

According to one variant, at least one of the two bottoms can be a dished bottom, preferably hemispherical. Indeed, these shapes allow the mass of the bottoms to be reduced while providing internal pressure resistance. A dished bottom is, by definition, the opposite of a flat bottom, with a concave shape directed outwards of the pressure tank.

According to one embodiment of the invention, the pressure tank can comprise a second ply of axial reinforcing elements, which extends in the axial direction (corresponding to the axis of the tubular part of the tank). Alternatively or additionally, axial reinforcing elements can include burial in the ground of at least the two bottoms of the pressure tank. Indeed, when the tank is subjected to an internal pressure, a force referred to as "bottom effect" tends to generate axial stresses in the tubular part of the tank. The axial reinforcing elements allow the bottom effect to be taken up and thereby prevent the cylindrical wall from taking up these forces alone. Thus, the cylindrical part may not participate or participates little in the taking up of the bottom effects.

When the tank comprises at least one dished bottom and at least a second ply of axial reinforcing elements, the axial reinforcing elements of the second ply can extend in the region of the dished bottom in the direction of the axial end of the dished bottom, by substantially forming a star on the dished bottom. Thus, the axial reinforcing elements participate in the taking up of the forces in the dished bottoms.

According to one implementation of the invention, at least a second ply of axial reinforcing elements can be positioned within the inner cylinder, and the axial reinforcing elements of the second ply can be evenly distributed over the circumference of the cylindrical wall. This configuration provides good distribution of the forces among the various axial reinforcements.

According to another implementation of the invention, at least a second ply of axial reinforcing elements can be positioned outside the tubular part and the axial reinforcing elements of the second ply can be evenly distributed over the circumference of the tubular part. This configuration simplifies manufacture and does not hinder internal inspection of the tank. This implementation may be combined with the implementation wherein a second ply of axial reinforcing elements can be positioned within the tank. Thus, the mechanical resistance to bottom effects can be improved.

Advantageously, the material of the circumferential reinforcing elements of the first ply can be a polymer, preferably an aramid fiber (notably known as Kevlar), a polyamide nylon PA, a polypropylene PP, a polyethylene PE or PES, Dyneema® for example, and more preferably a high resistance polyethylene generally known as PEHD. These materials provide good tensile strength and therefore allow good take-up of the circumferential stresses of the pressure tank.

Preferably, the material of the cylindrical wall can be a metallic material, preferably steel, or a polymer. Thus, sealing against the internal fluid can be improved.

According to a variant of the invention, the circumferential reinforcing elements of the first ply can be coated with a protective layer. This layer can provide protection of the circumferential reinforcing elements against chemical and/or physical damage in order to improve the resistance of the system to humidity, to ultraviolet rays or to an aggressive outdoor environment for example. This protective layer can be applied for example by spraying or injecting a material. This layer can be a resin such as an epoxy resin for example.

Moreover, the circumferential reinforcing elements of at least one of the first ply and the axial reinforcing elements of the second ply can have a circular, substantially circular or rectangular section. The circular section is simple to manufacture and it can therefore have a lower cost, notably when using cords comprising one or more strands twisted together. The rectangular shape is advantageous in that winding of the circumferential reinforcements around the cylindrical wall forms a near-continuous layer. The rectangular shape can for example be obtained from flat braided strands, which afford the advantage of being simple to manufacture. Thus, this reinforcement shape provides optimization of the thickness of the tubular part of the tank and of the pressure resistance thereof, and it prevents local effects of the cylindrical wall between the turns of the circumferential reinforcing elements.

According to an advantageous embodiment of the invention, the pressure tank can comprise at least one sliding connection between the cylindrical wall and at least one of the two bottoms. Indeed, the internal pressure of the tank creates a bottom effect through application of the pressure onto the bottoms. This bottom effect generates an axial tensile force in the tubular part of the tank. The sliding connection allows reducing or even cancelling the bottom effect in the tubular part by allowing at least one of the bottoms to slide axially.

According to an implementation of the invention, the sliding connection can be positioned between the outside diameter of the cylindrical wall and the inside diameter of the bottom. This configuration enables easier positioning with a bottom surrounding the tubular part.

According to another implementation of the invention, the sliding connection can be positioned between the inside diameter of the cylindrical wall and the outside diameter of the bottom. This implementation allows the bottom effect on the tubular part to be cancelled.

Advantageously, at least one of the two bottoms can be embedded in the ground. The ground thus allows the bottom effects to be taken up, which simplifies the design and therefore the manufacture of the tank.

The invention also relates to an energy storage and recovery system comprising at least one compressor, at least one expansion device, at least one heat storage and at least one compressed air tank as described above. Such a tank allows the cost of the energy storage and recovery system to be reduced.

FIG. 2 schematically illustrates, by way of non-limitative example, one embodiment of the device according to the invention. The pressure tank comprises a tubular part and two flat bottoms 5. Flat bottoms 5 could be replaced by dished bottoms, such as hemispherical bottoms. The tubular part comprises a cylindrical wall 1, a membrane for example, and one or more plies of circumferential reinforcing elements 2. For greater clarity of the figure, the plies of circumferential reinforcing elements 2 are shown only in a part of cylindrical wall 1. Preferably, the plies of circumferential reinforcing elements 2 cover the entire axial length of cylindrical wall 1. A ply can be one or more circumferential reinforcing elements 2. A circumferential reinforcing element 2 may be, for example, a cord wound around cylindrical wall 1. The cord provides a good resistance/mass ratio. Several plies may be used with each additional ply comprising at least one circumferential reinforcing element 2 wound around the previous ply. Therefore, the pressure resistance can be improved while limiting the weight of the tank and the manufacturing cost thereof. Using several plies of circumferential reinforcing elements 2 is particularly advantageous for large-volume pressure tanks, notably those of large diameter (diameter greater than 2 m) and/or of high internal pressure (pressure higher than 100 bars), such as those used for the energy storage and recovery.

In FIG. 2, F represents the direction of winding of circumferential reinforcing elements 2 around cylindrical wall 1.

Advantageously, the elastic modulus of the material of cylindrical wall 1 is less than the elastic modulus of the material of circumferential reinforcing elements 2. Thus, the circumferential deformation of cylindrical wall 1 is greater than that of circumferential reinforcements 2, which tends to press cylindrical wall 1 onto circumferential reinforcing elements 2 and to suitably distribute the pressure forces among cylindrical wall 1 and circumferential reinforcing elements 2. Furthermore, the breaking strength of circumferential reinforcing elements 2 can be greater than the breaking strength of cylindrical wall 1. Therefore, the mechanical strength of the tank is essentially provided by circumferential reinforcing elements 2. The function fulfilled by cylindrical wall 1 can then be limited to sealing against the fluid contained in the pressure tank, the ply of circumferential reinforcing elements 2 being not necessarily sealed on the one hand, and cylindrical wall 1 then allowing, on the other hand, to avoid contact between the internal fluid and circumferential reinforcing elements 2 limiting their degradation, for example.

FIG. 3a schematically shows, by way of non-limitative example, an embodiment of the invention where a circumferential reinforcing element of rectangular section 2r is wound around cylindrical wall 1. FIG. 3a is a half sectional view. A clearance 30 can be provided between the winding turns of circumferential reinforcing elements 2r or, on the contrary, clearance 30 may be cancelled in such a way that, during winding, the circumferential reinforcing element of turn n+1 is in contact with that of turn n. Thus, the ply forms a near-continuous surface around cylindrical wall 1, which avoids potential pinching of cylindrical wall 1 in clearances 30, pinching that might generate local stress peaks and cause premature breakage of cylindrical wall 1. Limitation of this clearance between the turns of circumferential reinforcing elements 2r prevents local buckling and excessive deformation of cylindrical wall 1 between two consecutive sections of circumferential reinforcing elements 2r. Indeed, too large a clearance could require local analyses and become a dimensioning criterion.

Furthermore, this near-continuous surface made up of circumferential reinforcing elements 2r allows optimizing take-up of the pressure forces by circumferential reinforcing elements 2r.

The rectangular section of circumferential reinforcing elements 2r further provides near continuity over the thickness of the elements The thickness of these elements is defined by the difference between the outside diameter of circumferential reinforcing elements 2r wound around cylindrical wall 1 and the inside diameter thereof.

FIG. 3b schematically illustrates, by way of non-limitative example, another embodiment of the invention where a circumferential reinforcing element of circular or substantially circular section 2c is wound around cylindrical wall 1. FIG. 3b is a half sectional view. It may be, for example, a cord comprising one or more strands twisted together. Thus, circumferential reinforcing elements 2c are not specific and provide limiting the manufacturing cost of the tank. As in FIG. 3a, circumferential reinforcing elements 2c may be wound to touch each other or, on the contrary, by leaving a clearance between each winding turn. When they touch, take-up of the force by circumferential reinforcing elements 2c is improved and the deformations of cylindrical wall 1 between circumferential reinforcing elements 2d are reduced.

The invention is not limited to the configurations of FIGS. 3a and 3b. A single ply may include both circumferential reinforcements of rectangular section and circumferential reinforcing elements of circular or substantially circular section. When several plies are used, one of the plies may comprise at least one circumferential reinforcing element of rectangular section and another ply may comprise at least one circumferential reinforcing element of circular or substantially circular section.

FIG. 4 schematically illustrates, by way of non-limitative example, another embodiment of a pressure tank according to the invention. FIG. 4 is a partial view of the tank where the bottoms are not shown. The tubular part then comprises a cylindrical wall 1, at least one ply of circumferential reinforcing elements 2 (of circular section here, but they could also be of substantially circular or rectangular section). Circumferential reinforcing elements 2 are then coated or covered with a protective layer 3. This protective layer may then fulfill several functions:
- protect circumferential reinforcing elements 2 against at least one of chemical and physical aggressions from the outdoor environment, such as ultraviolet rays, outside water or a fluid potentially aggressive to the material of circumferential reinforcing elements 2;
- participate in the take-up of the pressure forces in addition to circumferential reinforcing elements 2;
- prevent friction between the winding turns of circumferential reinforcing elements 2 and thereby prevent premature degradation; and
- serve as a thermal protection.

This protective layer can be, for example, a resin such as an epoxy resin.

This protective layer can be applied for example by spraying or by injecting a suitable protective material.

FIG. 5 schematically illustrates, by way of non-limitative example, a variant of the invention. In this variant, a ply of axial reinforcing elements 10 is shown. For greater clarity of the figure, the plies of circumferential reinforcing elements 2 are shown only in a part of cylindrical wall 1. Preferably, the plies of circumferential reinforcing elements 2 cover the entire axial length of cylindrical wall 1. Circumferential reinforcing elements 2 are wound around the cylindrical wall.

The pressure tank comprises two dished bottoms 25. Axial reinforcing elements 10 allow the axial forces resulting from the bottom effect to be taken up, thus making it possible to reduce the thickness of the cylindrical wall.

Axial reinforcing elements 10 extend longitudinally along the cylindrical wall and continue in the dished bottoms to an area close to the axis of the pressure tank. For example, axial reinforcing elements 10 can extend onto dished bottoms 25 by surrounding cylindrical body 8 of same axis as the tank axis and located at the axial end of the dished bottom. Thus, in a longitudinal section plane, the axial reinforcing element arriving in a direction d towards cylindrical body 8 partly surrounds this cylindrical body 8 and continues in a direction d' forming an angle T with direction d. Preferably, T is greater than or equal to 90°, and it is preferably close to 180°. Thus, the behavior of the axial reinforcing elements on the dished bottom is improved around cylindrical body 8.

Thus, the various axial reinforcing elements 10 configured to and from around cylindrical body 8 located at the axial end of dished bottom 25 form a star E comprising an even number of branches (8-pointed star here).

FIG. 6 schematically illustrates, by way of non-limitative example, another variant of a pressure tank according to the invention comprising a ply of axial reinforcing elements 10a with two flat bottoms 5. Axial reinforcing elements 10a are arranged within the pressure tank. The implantation diameter of these axial reinforcing elements 10a is thus less than the inside diameter of the cylindrical wall. Advantageously, these axial reinforcing elements 10a are evenly distributed over the circumference of the pressure tank to take up the axial tensile forces equally between the various axial reinforcing elements 10a. Furthermore, an axial reinforcing element 10a can be provided in the center of the pressure tank coincident with the axis of the pressure tank. This distribution also prevents bending of the tank that might be generated by a poor circumferential distribution.

These axial reinforcing elements 10a can have a circular or substantially circular section, for example cords with one or more strands twisted together. The cords provide a good resistance/mass ratio. Alternatively, other sections could be considered.

The material of these axial reinforcing elements 10a can advantageously be the same as that of the circumferential reinforcements.

This configuration enables good take-up of the axial forces.

FIG. 7 schematically illustrates, by way of non-limitative example, another variant of a pressure tank according to the invention comprising a ply of axial reinforcing elements 10b with two flat bottoms 5. Axial reinforcing elements 10b are arranged outside the pressure tank. The implantation diameter of these axial reinforcing elements 10b is thus greater than the outside diameter of the tubular part. Advantageously, these axial reinforcing elements 10b are evenly distributed over the circumference of the pressure tank to take up the axial tensile forces equally between the various axial reinforcing elements 10b. This distribution also prevents bending of the tank that might be generated by a poor circumferential distribution.

These axial reinforcing elements 10b can have a circular or substantially circular section, for example cords with one or more strands twisted together. The cords provide a good resistance/mass ratio. Alternatively, other sections could be considered.

The material of these axial reinforcing elements 10b can advantageously be the same as that of the circumferential reinforcements.

Arranging axial reinforcing elements 10b outside the pressure tank has the advantage of not hindering the inspection of the tank, notably for periodic checks. Furthermore, axial reinforcing elements 10b therefore do not have to pass through the tank body at bottoms 5, thereby avoiding associated leak risks.

FIG. 8 schematically illustrates, by way of non-limitative example, a fourth variant of the pressure tank provided with axial reinforcements. In this variant, the pressure tank comprises two plies of axial reinforcing elements 10a and 10b with two flat bottoms 5. The ply of axial reinforcing elements 10b is arranged outside the pressure tank (as in FIG. 7) while the ply of axial reinforcing elements 10a is arranged within the pressure tank (as in FIG. 6).

Axial reinforcing elements 10a and 10b can have a circular or substantially circular section as for example cords with one or more strands twisted together. Alternatively, other sections could be considered.

The material of these axial reinforcing elements 10a and 10b can advantageously be the same as that of the circumferential reinforcements.

This configuration enables increased take-up of the tensile forces.

FIGS. 9 to 13 schematically illustrate, by way of non-limitative example, embodiments of the pressure tank additionally comprising at least one sliding connection J between one of the bottoms 5, 5a or 5b, and the tubular part of the pressure tank.

Sliding connection J allows relative axial movement between a bottom 5, 5a or 5b, and the tubular part. Thus, the bottom effect induced by the pressure on bottom 5, 5a or 5b is taken up only partly or even entirely cancelled on the tubular part. The mass of the tubular part can therefore be reduced, as well as the cost thereof.

Sliding connection J can notably include elastomer seals, or spraying a polymer-based product.

In these figures, references 5, 5a and 5b respectively relate to a generic bottom, a bottom connected by a sliding connection to the tubular part and a bottom rigidly fixed to the tubular part.

In FIGS. 9 to 11, the tubular part comprises a cylindrical wall 1 and a ply of circumferential reinforcing elements 2. Axial reinforcing elements 10a are arranged within the pressure tank and axial reinforcing elements 10b are arranged outside the pressure tank. Axial reinforcing elements 10a and 10b extend longitudinally along the axis of the pressure tank. However, the implementation of sliding connections is independent of the use or not of axial reinforcing elements, and of the location thereof.

In FIG. 9, a sliding connection J is arranged between each of the two flat bottoms 5 and the tubular part. Furthermore, each one of these sliding connections J is positioned between the outside diameter of cylindrical wall 1 and the inside diameter of flat bottom 5. The axial force undergone by the cylindrical wall therefore is a compressive force.

Axial reinforcing elements 10a and 10b of the two plies internal and external to the pressure tank provide strength of the bottoms through the take-up of bottom effects.

In FIG. 10, a sliding connection J is arranged between each of the two flat bottoms 5 and the tubular part. Furthermore, each of these sliding connections J is positioned between the inside diameter of cylindrical wall 1 and the outside diameter of flat bottom 5. Therefore, the bottom effect due to the pressure on the bottoms is not retransmitted to the tubular part. Besides, the tubular part undergoes no axial force, which is a particularly advantageous configuration.

Take-up of the bottom effect is achieved here by the internal ply of axial reinforcing elements 10a. Take-up of the bottom effect is facilitated in this configuration in relation to that of FIG. 9.

FIG. 11 shows a configuration where one of the bottoms 5b is rigidly fixed to the tubular part. The other bottom 5a is connected to the tubular part by a sliding connection J. Sliding connection J is positioned between the outside diameter of cylindrical wall 1 and the inside diameter of flat bottom 5a. Thus, cylindrical wall 1 undergoes a compressive force induced by the pressure on the section of cylindrical wall 1, which is a relatively small force in relation to a tensile force due to the bottom effect induced by the pressure on the entire surface of the flat bottom 5a/5b.

The bottom effect is taken up by axial reinforcing elements 10a and 10b of the two plies.

FIG. 12 shows a variant of FIG. 11 where sliding connection J is positioned between the outside diameter of bottom 5a and the inside diameter of cylindrical wall 1. In this configuration, cylindrical wall 1, and more generally the tubular part, undergoes no tensile/compressive force.

The bottom effects are taken up by axial reinforcing elements 10a of the internal ply.

FIG. 13 illustrates a variant where the tank has a bottom 5b fastened to the tubular part and a bottom 5a connected to the tubular part by a sliding connection J. In this variant, the axial reinforcing elements include burial of the pressure tank in the ground 20. More specifically, the two flat bottoms 5a and 5b are buried in ground 20 and the ground can then serve as a stop for axial displacement of at least one of the two bottoms: the ground thus allows the axial displacement of at least one of the two bottoms to be limited. Alternatively, the bottoms may not be flat but dished, for example. This fitting in ground 20 acts as axial reinforcing elements by directly taking up the bottom effects represented by arrows L.

The tank may also be entirely buried, to be entirely covered on the outer surface thereof by ground 20.

The invention claimed is:

1. A pressure tank comprising:
    a tubular part and two bottoms, the two bottoms being positioned at ends of the tubular part, the tubular part comprising a cylindrical wall and at least a first ply of circumferential reinforcing elements wound around the cylindrical wall; and wherein
    an elastic modulus of the material of the cylindrical wall is at least 10% less than an elastic modulus of the material of the first ply of circumferential reinforcing elements.

2. A pressure tank as claimed in claim 1, wherein the elastic modulus of the cylindrical wall is at least 30% less than the elastic modulus of the cylindrical wall.

3. A pressure tank as claimed in claim 1, wherein at least one of the two bottoms is a dished spherical or hemispherical bottom.

4. A pressure tank as claimed in claim 2, wherein at least one of the two bottoms is a dished spherical or hemispherical bottom.

5. A pressure tank as claimed in claim 1, wherein the tank comprises at least a second ply of axial reinforcing elements which extends in at least one axial direction and the axial reinforcing elements include burial in the pressure tank in the ground.

6. A pressure tank as claimed in claim 3, comprising axial reinforcing elements of a second ply extending in a region of the dished bottom in a direction of an axial end of the dished bottom by forming a star on the dished bottom.

7. A pressure tank as claimed in claim 6, wherein at least the second ply of axial reinforcing elements is positioned within an inner cylinder defined by the cylindrical wall with the axial reinforcing elements of the second ply being evenly distributed over a circumference of the cylindrical wall.

8. A pressure tank as claimed in claim 5, wherein at least the second ply of the reinforcing elements is positioned outside a tubular part with the axial reinforcing elements of the second ply being evenly distributed over a circumference of the tubular part.

9. A pressure tank as claimed in claim 6, comprising at least the second ply of the reinforcing elements is positioned outside the tubular part with the axial reinforcing elements of the second ply being evenly distributed over a circumference of the tubular part.

10. A pressure tank as claimed in claim 1, wherein the circumferential reinforcing elements of the first ply comprise a polymer.

11. A pressure tank as claimed in claim 1, wherein the cylindrical wall is metallic.

12. A pressure tank as claimed in claim 1, wherein the circumferential reinforcing elements of the first ply are coated with a protective layer.

13. A pressure tank as claimed in claim 1, wherein the circumferential reinforcing elements of at least one of the first ply and the axial reinforcing elements of a second ply comprise a circular or a rectangular section.

14. A pressure tank as claimed in claim 1, wherein the tank comprises at least one sliding connection between the cylindrical wall and at least one of the bottoms.

15. A pressure tank as claimed in claim 14, wherein the at least one sliding connection is positioned between an outside diameter of the cylindrical wall and an inside diameter of at least one of the bottoms.

16. A pressure tank as claimed in claim 14, wherein the at least one sliding connection is positioned between an outside diameter of the bottoms and the inside diameter of the cylindrical wall.

17. A pressure tank as claimed in claim 1, wherein at least one of the bottoms is embedded in the ground.

18. An energy storage and recovery system comprising at least one compressor, at least one expansion device, at least one heat storage and at least one pressure tank in accordance with claim 1.

19. An energy storage and recovery system comprising at least one compressor, at least one expansion device, at least one heat storage and at least one pressure tank in accordance with claim 2.

20. An energy storage and recovery system comprising at least one compressor, at least one expansion device, at least one heat storage and at least one pressure tank in accordance with claim 3.

* * * * *